3,440,283
AMINE SEPARATION
Zaven A. Dadekian, Suffern, N.Y., assignor to Baird Chemical Industries, Inc., New York, N.Y., a corporation of New York
No Drawing. Filed Mar. 23, 1966, Ser. No. 537,693
Int. Cl. C07c 85/16, 87/06
U.S. Cl. 260—583                                11 Claims

ABSTRACT OF THE DISCLOSURE

An aqueous phase is separated from a tertiary amine phase in the presence of a quaternary ammonium compound by performing the separation at superatmospheric pressure in the presence of a dissolved lower dialkylamine.

---

This invention relates to the separation of an admixture of a tertiary amine and water. More specifically, the invention teaches a means of treating said admixture of these substantially immiscible liquids so that they form two sharply distinct phases which may be rapidly and efficiently separated.

The separation of tertiary amines from water is necessary for a variety of reasons. For example, the amine may become contaminated with water during storage by condensation or leakage, or the amine may be synthesized in a process performed in a reaction medium having an aqueous phase and an organic phase. Since these materials are substantially insoluble in one another the most convenient technique for separation would be to merely "cut" one phase from the other. Unfortunately, however, if the amine is undistilled and contains trace amounts of quaternary ammonium compounds formed during the production process, rather than forming two sharply distinct phases, the admixture of the tertiary amine and water forms an emulsion layer which will not "break" upon standing.

In accordance with this invention, it has been found that the aforesaid emulsion layer may be eliminated by saturating the admixture with a lower dialkylamine and maintaining the lower dialkylamine therein until the separation is substantially complete. Although the lower dialkylamine, a gas under processing conditions of temperature and pressure, is significantly soluble in the two phases, it is necessary to pressurize the separation system with the dialkylamine in order to dissolve a sufficient quantity of the gas to realize the advantages of the invention.

To maintain adequate solubility of the lower dialkylamine, the pressure on the system should be superatmospheric, preferably, at least seven atmospheres. Generally, the upper pressure limit is about 20 atmospheres, though pressures up to 30 atmospheres or higher may be used. The higher pressures have no apparent advantage because adequate lower dialkylamine is dissolved at lower pressures. In order to insure solution, the dialkylamine may be bubbled through the admixture or the admixture may be agitated.

Though the temperature has some effect on solubility, it is not particularly important in the practice of the invention. Of course, the temperature must be such that the system remains in the liquid phase, and, as a practical matter, the temperature should be between the freezing point of the system and about 250° C. Similarly, the ratio of the water to the tertiary amine may vary widely, it being necessary only that two phases, i.e., more than soluble trace amounts of the lesser phase, be present. Broadly, about 200:1 to 1:200 ratio of water to tertiary amine (by volume) are present, preferably, from about 50:1 to 1:100.

The tertiary amines of the instant invention may be represented by the formula: RNR'R", where R is a straight or branched chain, primary or secondary alkyl group having 4 to 22 carbon atoms, preferably a primary straight or branched chain alkyl group having from 8 to 18 carbon atoms, and R' and R" are alkyl groups each having from 1 to 4 carbon atoms, preferably 1 or 2 carbon atoms. The lower dialkylamines of the invention are those having from 1 to 4, preferably, 1 or 2 carbon atoms in each alkyl group. Examples of the tertiary amines are n-octyl dimethylamine, n-dodecyl dimethylamine, stearyl dimethylamine, n-hexyl diethylamine, tridecyl diethylamine, pentadecyl methylethylamine, decyl methylethylamine, decyl dipropylamine and tetradecyl methylbutylamine.

The lower dialkylamines are those having from 1 to 4 carbon atoms, preferably 1 or 2, in each alkyl group. Examples of these amines are dimethylamine, diethylamine, dipropylamine, dibutylamine, methylethylamine, methylpropylamine and methylbutylamine.

The quaternary ammonium compounds which emulsify the admixture commonly are formed as trace components in the preparation of the ternary amines. For example in the preparation of n-dodecyl dimethylamine, as described in Example VI, small amounts of mixed tetralkyl ammonium chlorides are formed, e.g., didodecyl dimethylammonium chloride.

The instant invention may be advantageously employed in conjunction with the preparation of tertiary amines by the reaction of an alkyl iodide, chloride or bromide with an excess of a lower dialkylamine in the presence of an aqueous phase and an organic phase. The reaction is carried out with the gradual addition of an alkaline material. The latter reacts with the dialkylamine hydrohalide which is formed during the reaction, and, in turn, regenerates the free dialkylamine and forms salt. Additionally, trace amounts of quaternary ammonium compounds are formed in the reaction. The salt, for the most part, is dissolved in the water phase and the product tertiary amine forms in the organic phase. To obtain the finished product it is of course necessary to separate water.

In accordance with the teaching of the instant invention it has been discovered that the two phases may be cleanly separated by maintaining them under pressure of the dialkylamine. This latter constituent is already present in the reaction vessel because the reaction is preferably performed with a molar excess. Additionally, the pressure at the end of the reaction may be adequate to dissolve the requisite amount of the dialkylamine in the two phases. Where these conditions prevail, i.e., the presence of the dialkylamine and elevated pressure, care must be taken to prevent venting the system prior to the separation of the two phases. If necessary, additional dialkylamine may be added under pressure prior to the separation. The reaction of the alkyl halide and the dialkylamine to form a tertiary amine is more fully described in the patent application of Dadekian and Wilbourn entitled Amination, Serial No. 537,708, filed simultaneously herewith.

To describe more fully the instant invention the following examples are set forth:

Example I

One part by volume of undistilled dodecyl dimethylamine containing trace amounts of a quaternary ammonium compound is mixed with one part of water at atmospheric pressure. The mixture is permitted to settle overnight at room temperature. The following morning the mixture is observed and it is noted that three layers are present. The upper and lower layers, the tertiary amine and water, respectively, are clear liquids, but the intermediate layer is a cloudy white emulsion. This emulsion layer comprises about 20% of the total admixture.

It is evident that a complete separation of the two liquids cannot be made.

In accordance with the invention, dimethylamine under about 10 atmospheres of pressure is bubbled through the admixture. The lower water phase is "cut" from the vessel while the pressure of dimethylamine is maintained. It is noted that the cloudy intermediate phase is no longer present and that substantially all the water is recovered uncontaminated with the tertiary amine. Analysis of the residual tertiary amine phase also shows substantially complete recovery of the pure product.

Example II

An admixture identical to that described above is again placed under 10 atmospheres of dimethylamine pressure. Prior to "cutting" the water phase, however, the dimethylamine is vented to the atmosphere. Upon draining off the water phase a cloudy white emulsion appears. The separation is discontinued after all the emulsion is removed. Analysis of the tertiary amine fraction indicates a recovery of about 80% indicating that about 20% is emulsified with the water.

Example III

Example I is repeated except that undistilled n-octyl dimethylamine and undistilled stearyl dimethylamine are employed. In both cases the emulsion is "broken" when the admixtures are placed under 10 atmospheres of dimethylamine pressure. Separation of the two remaining phases, while the pressure is maintained, results in complete recovery of the products.

Example IV

Examples I and III are repeated except that the pressure is increased to 15 atmospheres. Substantially the same results are obtained.

Example V

Example I is repeated except that the admixture is placed under 5 atmospheres of diethylamine at a temperature of 150° C. during the separation. The emulsion is again effectively broken and the two phases sharply separated.

Example VI

In an agitated reactor 1200 lbs. of dodecyl chloride are reacted with a 2:1 molar excess of dimethylamine. The latter material is added with an equal volume of water. The reaction temperature is increased to about 116° C. and a 50% aqueous solution of sodium hydroxide added at a constant rate after the reaction is underway. A 10% molar excess of the caustic, based on the dimethylamine hydrochloride, is added over an interval of one hour. The batch is maintained at 116° C. for three hours and thereafter raised to 140° C. for 15 minutes. The batch is then cooled to 121° C. and allowed to settle. Both the water phase and the tertiary amine phase are saturated with dimethylamine at a pressure of about 18 atmospheres. After about 15 minutes settling time the salt water phase is "cut" under the aforesaid batch pressure and the interface detected by means of change in electrical conductivity. Similarly, the amine phase is blown into another tank from where it is subjected to further purification. The separated water phase is accumulated in a hold tank and amine floating on the water phase is periodically recovered. This residual amine amounts to only 2% of the total tertiary amine recovered. This indicates that the water amine interface is extremely sharp.

Example VII

Example VI is repeated except that the reaction vessel is vented during the settling period. A cloudy emulsion appears between the aqueous and organic phase as evidenced by inspection of the water "cut." This emulsion contains about 20% of the total tertiary amine formed and requires additional processing for its recovery.

Example VIII

Example VII is repeated except the dodecyl chloride is replaced by a normal tridecyl chloride containing a mixture of branched chain isomers. Maintaining the reaction pressure during the phase separation, thereby keeping the dimethylamine in solution, results in a sharp separation of the two materials comparable to that obtained in Example VI.

Having thus described my invention, what I claim and desire to protect by Letters Patent is:

1. In a process for separating an aqueous phase from a tertiary amine phase in the presence of a quaternary ammonium compound, said tertiary amine having the formula RNR′R″, wherein R is a straight or branched, primary or secondary alkyl group having from 4 to 22 carbon atoms, and R′ and R″ are each lower alkyl groups having from 1 to 4 carbon atoms, the improvement of performing said separation at superatmospheric pressure in the presence of dissolved lower dialkylamine.

2. The process of claim 1 wherein said phases are saturated with said lower dialkylamine at superatmospheric pressure.

3. The process of claim 2 wherein said pressure is at least seven atmospheres.

4. The process of claim 1 wherein R is a primary alkyl group having from 8 to 18 carbon atoms and R′ and R″ each have 1 or 2 carbon atoms.

5. The process of claim 4 wherein R′ and R″ are both methyl groups.

6. The process of claim 1 wherein said lower dialkylamine is dimethylamine.

7. In a process for the preparation of tertiary amines wherein an alkyl chloride, bromide or iodide is reacted with an excess lower dialkylamine in a reaction medium having an aqueous phase and an organic phase, wherein said organic phase contains said tertiary amine at the end of the reaction, and wherein said organic phase is separated from said aqueous phase, the improvement of performing said separation at superatmospheric pressure in the presence of dissolved lower dialkylamine.

8. The process of claim 7 wherein said phases are saturated with said dialkylamine at superatmospheric pressure.

9. The process of claim 9 wherein the pressure at the end of said reaction is at least seven atmospheres and said phases are saturated with gaseous dialkyl amine.

10. In a process for preparing a tertiary amine by the reaction of a normal primary alkyl chloride having from 8 to 18 carbon atoms with an excess of dimethylamine, wherein the reaction takes place in a two phase system, said two phases being an aqueous phase and an organic phase containing said tertiary amine at the end of said reaction, and wherein the vapor space above said phases at the completion of said reaction contains a pressure of at least seven atmospheres of dimethylamine, the improvement of separating said aqueous phase and said organic phase while maintaining said pressure above said phases, thereby maintaining a sharp interface between said phases during said separation.

11. The process of claim 10 wherein the aqueous phase is drained from said reaction zone prior to said organic phase.

References Cited

UNITED STATES PATENTS 3,299,142   1/1967   Simpson.

CHARLES B. PARKER, *Primary Examiner.*

R. L. RAYMOND, *Assistant Examiner.*

U.S. Cl. X.R.

260—585.5, 666, 999, 633

U.S. DEPARTMENT OF COMMERCE
PATENT OFFICE
Washington, D.C. 20231

UNITED STATES PATENT OFFICE
CERTIFICATE OF CORRECTION

Patent No. 3,440,283 April 22, 1969

Zaven A. Dadekian

It is certified that error appears in the above identified patent and that said Letters Patent are hereby corrected as shown below:

Column 4, line 45, claim reference numeral "9" should read -- 7 --.

Signed and sealed this 3rd day of March 1970.

(SEAL)
Attest:

Edward M. Fletcher, Jr.      WILLIAM E. SCHUYLER, JR.
Attesting Officer      Commissioner of Patents